US011429735B2

(12) United States Patent
Lee et al.

(10) Patent No.: US 11,429,735 B2
(45) Date of Patent: Aug. 30, 2022

(54) METHOD AND APPARATUS FOR DATA ENCRYPTION, METHOD AND APPARATUS FOR DATA DECRYPTION

(71) Applicant: SAMSUNG SDS CO., LTD., Seoul (KR)

(72) Inventors: Chang-Hoon Lee, Seoul (KR); Jang-Hyuk Ahn, Seoul (KR); Dong-Ghu Seon, Seoul (KR); Ki-Young Kim, Seoul (KR); Young-Hwa Lee, Seoul (KR); Ji-Sang Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 106 days.

(21) Appl. No.: 16/665,846

(22) Filed: Oct. 28, 2019

(65) Prior Publication Data
US 2021/0110052 A1 Apr. 15, 2021

(30) Foreign Application Priority Data
Oct. 14, 2019 (KR) .................. 10-2019-0126812

(51) Int. Cl.
 *G06F 21/62* (2013.01)
 *G06F 16/2453* (2019.01)
 *G06F 21/60* (2013.01)
 *H04L 9/08* (2006.01)

(52) U.S. Cl.
 CPC .... *G06F 21/6218* (2013.01); *G06F 16/24534* (2019.01); *G06F 21/602* (2013.01); *H04L 9/0894* (2013.01)

(58) Field of Classification Search
None
See application file for complete search history.

(56) References Cited

U.S. PATENT DOCUMENTS

| 2013/0246813 | A1* | 9/2013 | Mori .................. G06F 21/6227 713/193 |
| 2019/0005248 | A1 | 1/2019 | Krishnamurthy et al. |
| 2019/0108255 | A1 | 4/2019 | Tabak et al. |
| 2019/0114438 | A1* | 4/2019 | Hersans ............... H04L 9/0894 |
| 2019/0171843 | A1* | 6/2019 | Sun ...................... H04L 9/0618 |
| 2019/0286837 | A1 | 9/2019 | Yim et al. |

FOREIGN PATENT DOCUMENTS

KR 10-1501508 B1 3/2015

OTHER PUBLICATIONS

European Search Report for EP20171496.1 dated Sep. 24, 2020 from European patent office in a counterpart European patent application.

* cited by examiner

*Primary Examiner* — Brandon Hoffman
(74) *Attorney, Agent, or Firm* — The PL Law Group, PLLC

(57) ABSTRACT

A method of data encryption according to one embodiment includes generating a structured query language (SQL) syntax that includes manipulation target data and encryption policy identification information in the form of an annotation regarding the manipulation target data, receiving encryption policy information that corresponds to the encryption policy identification information in the form of an annotation from an encryption policy server, and converting the manipulation target data in the SQL syntax into cipher text on the basis of the encryption policy information.

20 Claims, 9 Drawing Sheets

INSERT INTO USER (USER_ID, USER_NAME) VALUES ('SE(!@#$%^)', 'SE(*&^%$#)');
        |_____310_____|          |_420_|_____411_____|  |_420_|___413___|
                                                                  |_____410_____|

…

METHOD AND APPARATUS FOR DATA ENCRYPTION, METHOD AND APPARATUS FOR DATA DECRYPTION

CROSS REFERENCE TO RELATED APPLICATIONS AND CLAIM OF PRIORITY

This application claims the benefit of Korean Patent Application No. 10-2019-0126812 filed on Oct. 14, 2019 in the Korean Intellectual Property Office, the disclosure of which is incorporated herein by reference in its entirety.

TECHNICAL FIELD

The following description relates to data encryption and data decryption technologies for ensuring security for data stored in a database.

BACKGROUND ART

Recently, the use of database encryption technology for encrypting data stored in a database to ensure the confidentiality and security of the data is becoming common.

Examples of existing database encryption technologies include various schemes, such as an application programming interface (API) scheme, a plug-in scheme, a network proxy scheme, and the like.

The API scheme requires rebuilding of the entire application program because the encryption of data affects the logic (e.g., java and C# code) of the application program. Also, the API scheme has a difficulty in switching between before and after application of encryption due to the rebuilding process for the logic of the application program.

In a case where the plug-in scheme is used in the form of delegating database management to a cloud service provider, there is a constraint that an encryption processing module must be installed in a database. Also, due to the encryption processing module included in the database, the plug-in scheme has a problem in that load is concentrated on the database as a usage rate of a database management system is increased.

In a case where a database is used by multiplexing an instance of an application program, the network proxy scheme requires multiplexing of an instance of a network proxy node, which complicates the overall configuration of a database system.

SUMMARY

The disclosed embodiments are intended to provide a method and apparatus for data encryption and a method and apparatus for data decryption.

In one general aspect, there is provided A method of data encryption including generating a structured query language (SQL) syntax that includes manipulation target data and encryption policy identification information in the form of an annotation regarding the manipulation target data, receiving encryption policy information that corresponds to the encryption policy identification information in the form of an annotation from an encryption policy server, and converting the manipulation target data in the SQL syntax into cipher text on the basis of the encryption policy information.

The encryption policy information may include at least one of a cipher key and a cipher algorithm for the encryption.

The receiving and converting may be performed at a database connectivity driver.

The receiving of the encryption policy information may include requesting, at the database connectivity driver, the encryption policy server for the encryption policy information on the basis of the encryption policy identification information and receiving the encryption policy information from the encryption policy server.

The method may further include, after converting the manipulation target data, transmitting a SQL syntax that includes the cipher text, encryption application identification information, and decryption policy identification information to a database through the database connectivity driver.

In another general aspect, there is provided an apparatus for data encryption including one or more processors, a memory, and one or more programs, wherein the one or more programs are stored in the memory and are configured to be executed by the one or more processors and the one or more programs include commands for generating a structured query language (SQL) syntax that includes manipulation target data and encryption policy identification information in the form of an annotation regarding the manipulation target data, receiving encryption policy information that corresponds to the encryption policy identification information in the form of an annotation from an encryption policy server, and converting the manipulation target data in the SQL syntax into cipher text on the basis of the encryption policy information.

The encryption policy information may include at least one of a cipher key and a cipher algorithm for the encryption.

The commands for receiving and converting may be performed by a database connectivity driver included in the one or more programs.

The commands for receiving the encryption policy information may include a command for requesting the encryption policy server for the encryption policy information on the basis of the encryption policy identification information and a command for receiving the encryption policy information from the encryption policy server.

The one or more programs may further include commands for transmitting a SQL syntax that includes the cipher text and decryption policy identification information to a database through the database connectivity driver.

In still another general aspect, there is provided a method of data decryption including receiving encrypted manipulation target data from a database, receiving decryption policy information that corresponds to decryption policy identification information for the encrypted manipulation target data from an encryption policy server on the basis of the decryption policy identification information, and decrypting the encrypted manipulation target data on the basis of the decryption policy information.

The decryption policy information may include at least one of a cipher key and a cipher algorithm for the decryption.

The receiving of the encrypted manipulation target data, the receiving of the decryption policy information, and the decrypting the encrypted manipulation target data may be performed by a database connectivity driver.

The receiving of the decryption policy information may include requesting, at the database connectivity driver, the encryption policy server for the decryption policy information on the basis of the decryption policy identification information and receiving the decryption policy information from the encryption policy server.

The method may further include providing the acquired manipulation target data to a user.

In yet another general aspect, there is provided an apparatus for data decryption including one or more processors, a memory, and one or more programs, wherein the one or more programs are stored in the memory and are configured to be executed by the one or more processors and the one or more programs include commands for receiving encrypted manipulation target data from a database, receiving decryption policy information that corresponds to decryption policy identification information for the encrypted manipulation target data from an encryption policy server on the basis of the decryption policy identification information, and by decrypting the encrypted manipulation target data on the basis of the decryption policy information.

The decryption policy information may include at least one of a cipher key and a cipher algorithm for the decryption.

The commands for receiving the encrypted manipulation target data, receiving the decryption policy information, and decrypting the encrypted manipulation target data may be performed by a database connectivity driver included in the one or more programs.

The commands for receiving the decryption policy information may include a command for requesting the encryption policy server for the decryption policy information on the basis of the decryption policy identification information and a command for receiving the decryption policy information from the encryption policy server.

The one or more programs may further include commands for providing the acquired manipulation target data to a user.

According to the disclosed embodiments, encryption policy identification information in the form of an annotation is included in a SQL syntax, so that only a portion of the SQL syntax is modified without affecting the logic of an application program when manipulation target data is encrypted, thereby avoiding a rebuilding process for the entire application program.

Also, according to the disclosed embodiments, encryption for the manipulation target data is performed in the database connectivity driver on the basis of the encryption policy information, so that it is possible to facilitate switching between before and after application of encryption technology.

BRIEF DESCRIPTION OF THE DRAWINGS

FIG. 4 is a diagram illustrating an example of a SQL syntax that includes cipher text for manipulation target data according to one embodiment.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
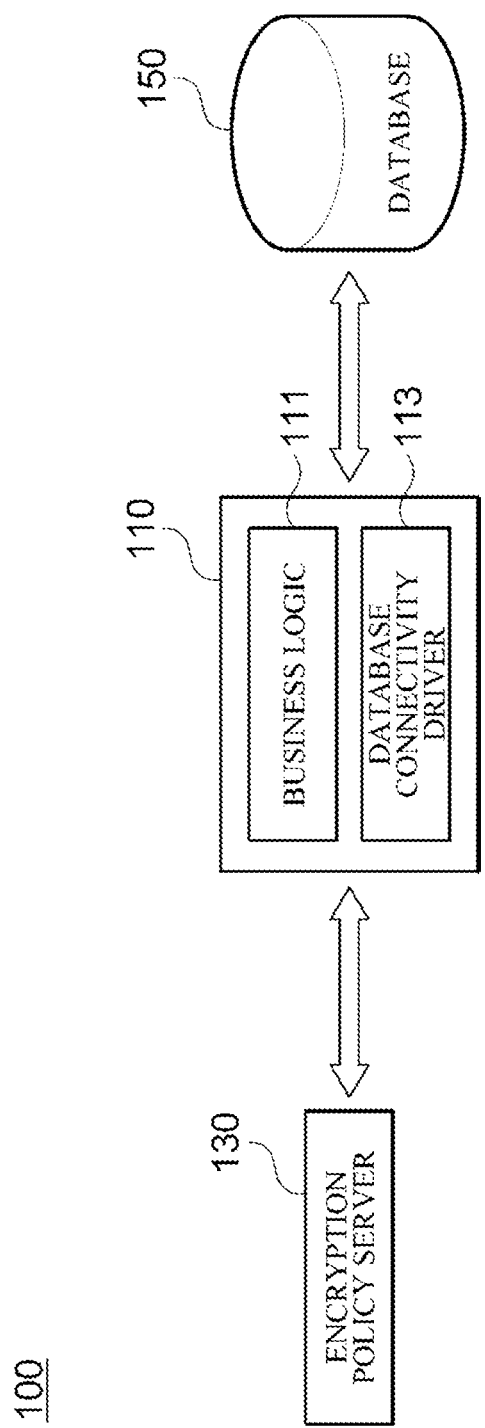
FIG. 1 is a diagram illustrating a configuration of a database system according to one embodiment.

FIG. 1 is a diagram illustrating a configuration of a database system 100 according to one embodiment.

The database system 100 stores data in a database 150 and provides a database service for managing the data stored in the database 150.

In one embodiment, the database service provided by the database system 100 may be a cloud environment-based database service. However, the database service may include a database service provided in an On-Premise environment, as well as in a cloud environment.

Referring to FIG. 1, the database system 100 includes a client device 110, an encryption policy server 130, and a database 150.

The client device 110 is a device in which an application program for providing an interface for a user to access the database 150 is installed. In a disclosed embodiment, a data encryption device and a data decryption device may each be implemented as a part of the client device 110.

In one embodiment, the application program installed in the client device 110 may include business logic 111 and a database connectivity driver 113.

The business logic 111 may perform data processing in the client device 110. In one embodiment, the business logic 111 may generate a structured query language (SQL) syntax including manipulation target data and a data manipulation language (DML) syntax for the manipulation target data on the basis of a user request.

In this case, the manipulation target data may be data that is a target of a data manipulation function according to a user request. For example, the manipulation target data may include user identification information, such as user's ID, password, name, and the like, but is not necessarily limited thereto, and may include a variety of information according to an embodiment.

The DML may be data language for requesting the database 150 to perform a data manipulation function, such as data retrieval (SELECT), data insertion (INSERT), data modification (UPDATE), data deletion (DELETE), and the like.

In one embodiment, the business logic 111 may generate a SQL syntax including encryption policy identification information in the form of an annotation regarding the manipulation target data. In this case, the encryption policy identification information may be metadata for requesting the encryption policy server 130 for encryption policy information used for encrypting the manipulation target data. For example, the business logic 111 may identify the manipulation target data on the basis of the logic set by a developer of the application program installed in the client device 110 and write the encryption policy identification information for the manipulation target data as an annotation of the SQL syntax.

The database connectivity driver 113 may allow the client device 110 to access the database 150 and to perform a data manipulation function. In one embodiment, the database connectivity driver may provide an application programming interface (API) for connecting the client device 110 and the database 150, such as java database connectivity (JDBC), open database connectivity (ODBC), or the like.

Also, the database connectivity driver 113 may perform encryption for the manipulation target data in association with the encryption policy server 130. For example, the database connectivity driver 113 may be extended to further provide an API for performing encryption for the manipulation target data, in addition to the API for connecting the client device 110 and the database 150, such as JDBC, ODBC, or the like.

Specifically, the database connectivity driver 113 may receive the SQL syntax for the user request from the business logic 111 and generate cipher text for the manipulation target data included in the SQL syntax in association with the encryption policy server 130. Also, the database connectivity driver 113 may transmit a SQL syntax including the generated cipher text to the database 150.

The encryption function included in the database connectivity driver 113 may be turned on/off. For example, the user may determine whether to encrypt the manipulation target data by turning on/off the encryption function included in the database connectivity driver 113. Therefore, according to the disclosed embodiments, by freely manipulating the encryption function of the database connectivity driver 113, the user may easily switch whether to apply encryption to the manipulation target data.

The encryption policy server 130 is a server for managing encryption policy information and decryption policy information.

In this case, the encryption policy information may be information that defines encryption policies on the database system 100. In one embodiment, the encryption policy information may include a cipher key and a cipher algorithm for encryption for the manipulation target data, whether partial encryption is applied, a range to which partial encryption is applied, and the like. The encryption policy information may differ depending on a class of the manipulation target data. For example, encryption policy information for "ID" class may be different from encryption policy information for "name" class.

The decryption policy information may be information that defines decryption policies on the database system 100. In one embodiment, the decryption policy information may include a cipher key and a cipher algorithm for decryption of encrypted manipulation target data, and the like. In this case, the decryption policy information may differ depending on a class of the encrypted manipulation target data.

The above-described encryption policy information and decryption policy information are merely examples and may include a variety of information related to encryption polices and decryption policies according to an embodiment.

The encryption policy server 130 may provide the encryption policy information or the decryption policy information to the client device 110 on the basis of a request of the client device 110.

The database 150 stores data therein and manages the stored data.

In one embodiment, the database 150 may store manipulation target data encrypted based on the encryption policy information.

Also, the database 150 may receive the SQL syntax for the user request from the client device 110 and perform the data manipulation functions, such as data retrieval, data insertion, data modification, data deletion, and the like.

Figure 2:
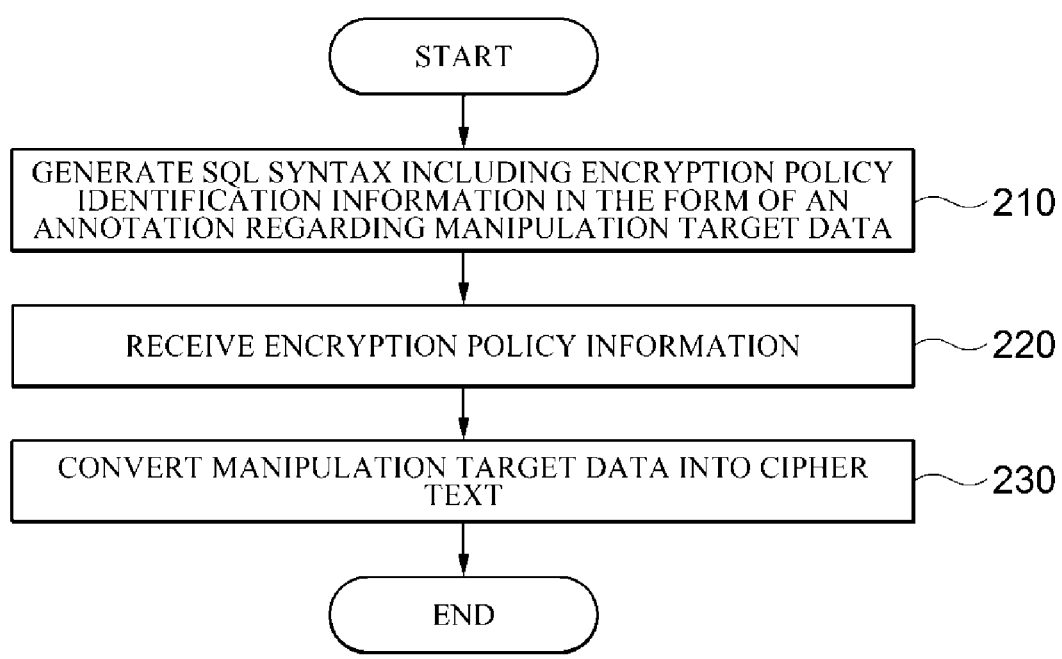
FIG. 2 is a flowchart illustrating a method of data encryption according to one embodiment.

FIG. 2 is a flowchart illustrating a method of data encryption according to one embodiment.

The method illustrated in FIG. 2 may be performed by the client device 110 illustrated in FIG. 1.

The client device 110 generates a SQL syntax including manipulation target data and encryption policy identification information in the form of an annotation regarding the manipulation target data (210).

For example, the client device 110 may identify the manipulation target data and a class of the manipulation target data through the business logic 111 and generate the encryption policy identification information for the manipulation target data into a form of an annotation of the SQL syntax on the basis of the class of the manipulation target data. In this case, the annotation of the SQL syntax may be generated in the text form, such as "/* */".

The encryption policy identification information may differ depending on the class of the manipulation target data. For example, encryption policy identification information for "ID" class and encryption policy identification information for "name" class may differ from each other.

In one embodiment, the SQL syntax may include a DML syntax, manipulation target data, and an annotation which correspond to the user request.

For example, it is assumed that the client device 110 receives a data insertion request for storing the ID and name of the user in the database 150 from the user. In this case, as shown in FIG. 3, the client device 110 may generate a SQL syntax 300 including the DML syntax 310 which corresponds to the data insertion request.

Figure 3:
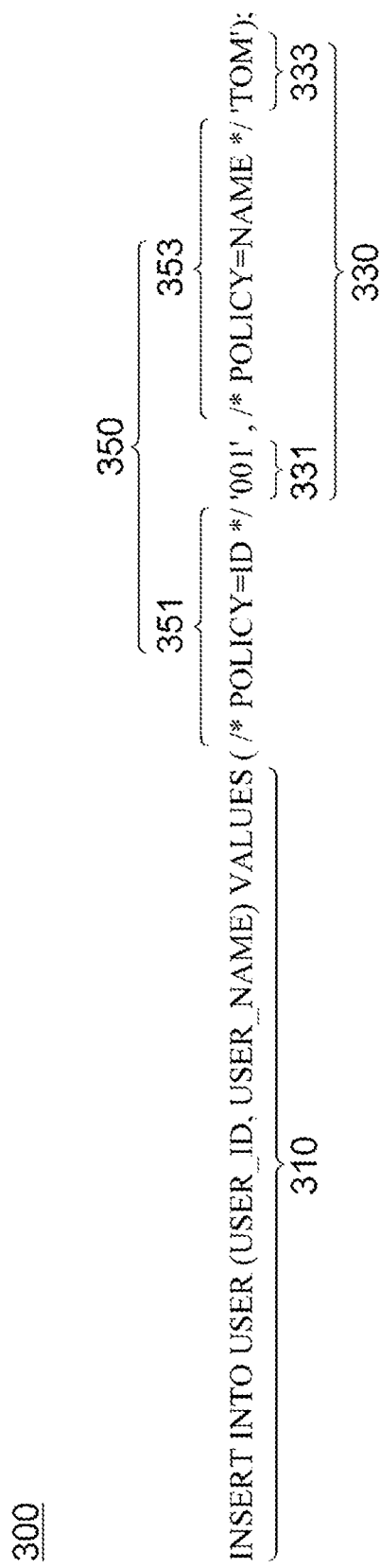
FIG. 3 is a diagram illustrating an example of a structured query language (SQL) syntax that includes manipulation target data and encryption policy identification information in the form of an annotation according to one embodiment.

Specifically, referring to FIG. 3, the SQL syntax 300 may include a DML syntax 310 related to data insertion, manipulation target data 330, and encryption policy identification information 350 in the form of an annotation. Specifically, a portion of "INSERT INTO USER (USER_ID, USER_NAME) VALUES" in the SQL syntax 300 may be the DML syntax 310 related to data insertion. Also, a portion of "001" in the SQL syntax 300 is an ID 331 of the user, which is the manipulation target data 330, and a portion of "TOM" is a name 333 of the user, which is the manipulation target data 330. In addition, "/* POLICY=ID */" in the SQL syntax 300 may be the encryption policy identification information 351 in the form of an annotation regarding the ID 331 of the user and "/* POLICY=NAME */" may be the encryption policy identification information 353 in the form of an annotation regarding the name 333 of the user.

In FIG. 3, the encryption policy identification information is described as being positioned at the front of the manipulation target data, but the position of the encryption policy identification information in the form of an annotation may vary in the SQL syntax.

The client device 110 may transmit the SQL syntax generated through the business logic 111 to the database connectivity driver 113.

Then, the client device 110 receives encryption policy information that corresponds to the encryption policy identification information in the form of an annotation from the encryption policy server 130 (220).

In one embodiment, the client device 110 may request the encryption policy server 130 for encryption policy information on the basis of the encryption policy identification information through the database connectivity driver 113. The encryption policy server 130 may transmit the encryption policy information in response to a request of the client device 110, and the client device 110 may receive the encryption policy information from the encryption policy server 130 through the database connectivity driver 113.

Then, the client device 110 converts the manipulation target data in the SQL syntax into cipher text on the basis of the encryption policy information (230).

Specifically, the client device 110 may convert the manipulation target data into cipher text by encrypting the manipulation target data included in the SQL syntax through the database connectivity driver 113 on the basis of a cipher key and a cipher algorithm for encryption which are included in the encryption policy information.

According to one embodiment, the client device 110 may convert the SQL syntax to include the cipher text and encryption application identification information on the basis of the encryption policy information. In this case, the encryption application identification information may be information that indicates that encryption is applied based on the encryption policy information.

For example, as shown in FIG. 4, the converted SQL syntax 400 may include a DML syntax 310, cipher text 410 for manipulation target data, and encryption application identification information 420. Specifically, referring to FIGS. 3 and 4, the converted SQL syntax 400 may include cipher text 411 of "!@#$%^" for the ID 331 of the user and cipher text 413 of "*&^%$#" for the name 333 of the user. In addition, the converted SQL syntax 400 may include "SE( )", which is the encryption application identification information 420. In this case, the encryption policy identification information 351 and 353 in the form of annotations may be removed from the converted SQL syntax 400.

Meanwhile, unlike what is shown in FIG. 4, the form of the cipher text may vary according to a cipher algorithm included in the encryption policy information.

In the above example, the encryption application identification information is illustrated as "SE( )," which is merely an example, and may vary according to an embodiment. In the above example, the converted SQL syntax is illustrated as including the encryption application identification information, but is not necessarily limited thereto. For example, the encryption application identification information may be encrypted on the basis of the encryption policy information and be included in the cipher text for the manipulation target data.

In addition, in one embodiment, the client device 110 may convert the SQL syntax to include the decryption policy identification information on the basis of the encryption policy information.

In this case, the decryption policy identification information may be metadata for requesting the encryption policy server 130 for decryption policy information for decryption of encrypted manipulation target data.

Meanwhile, in the above example, the converted SQL syntax is illustrated as including the decryption policy identification information, but is not necessarily limited thereto.

For example, the decryption identification information may be generated in the form of an annotation of the SQL syntax. Specifically, the client device 110 may generate the SQL syntax including the decryption policy identification information in the form of an annotation through the business logic 111. In this case, in a case where the database connectivity driver 113 converts the SQL syntax on the basis of the encryption policy information, the decryption policy identification information may be removed from the converted SQL syntax and stored in a memory inside the database connectivity driver 113. Then, the decryption policy identification information stored in the database connectivity driver 113 may be used for future decryption of the encrypted manipulation target data.

Figure 5:
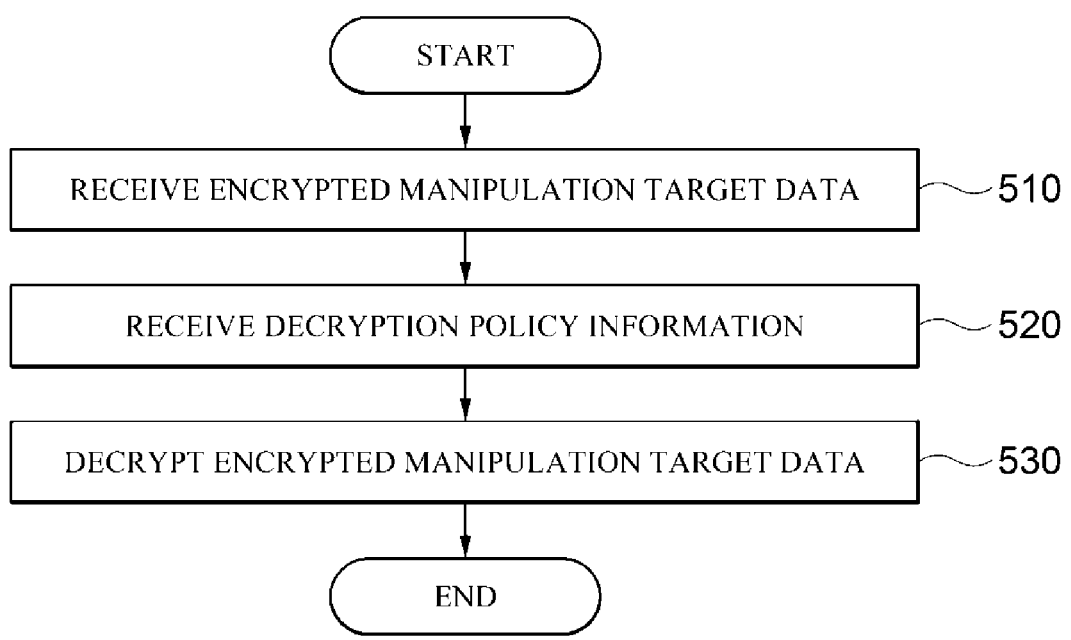
FIG. 5 is a flowchart illustrating a method of data decryption according to one embodiment.

FIG. 5 is a flowchart illustrating a method of data decryption according to one embodiment.

The method illustrated in FIG. 5 may be performed by, for example, the client device 110 illustrated in FIG. 1.

Referring to FIG. 5, the client device 110 receives encrypted manipulation target data from the database 150 (510).

In one embodiment, the client device 110 may receive the encrypted manipulation target data and encryption application identification information from the database 150 through the database connectivity driver 113.

In addition, when decryption policy identification information is included in a SQL syntax and transmitted to the database 150, the client device 110 may receive the decryption policy identification information from the database 150.

In contrast, in the case where the decryption policy identification information is stored in the database connectivity driver 113, the client device 110 may perform decryption using the decryption policy identification information stored in the database connectivity driver 113.

Then, the client device 110 receives decryption policy information that corresponds to the decryption policy identification information from the encryption policy server 130 on the basis of the decryption policy identification information (520).

Specifically, the client device 110 may identify cipher text on the basis of the encryption application identification information through the database connectivity driver 113. In addition, the client device 110 may request the encryption policy server 130 for the decryption policy information on the basis of the decryption policy identification information through the database connectivity driver 113. In this case, the encryption policy server 130 may transmit the decryption policy information that corresponds to the decryption policy identification information to the client 110 according to a request of the client 110.

Then, the client 110 decrypts the encrypted manipulation target data on the basis of the decryption policy information (530).

Specifically, the client 110 may acquire the manipulation target data by decrypting the encrypted manipulation target data using the decryption policy information through the database connectivity driver 113. Also, the client 110 may transmit the acquired manipulation target data to the business logic 111 and transmit the manipulation target data to the user via the business logic 111.

Meanwhile, in the flowcharts illustrated in FIGS. 2 and 5, the method is described as being divided into a plurality of operations. However, it should be noted that at least some of the operations may be performed in a different order or may be combined into fewer operations or further divided into more operations. In addition, some of the operations may be omitted, or one or more extra operations, which are not illustrated, may be added to the flowchart and be performed.

Figure 6:
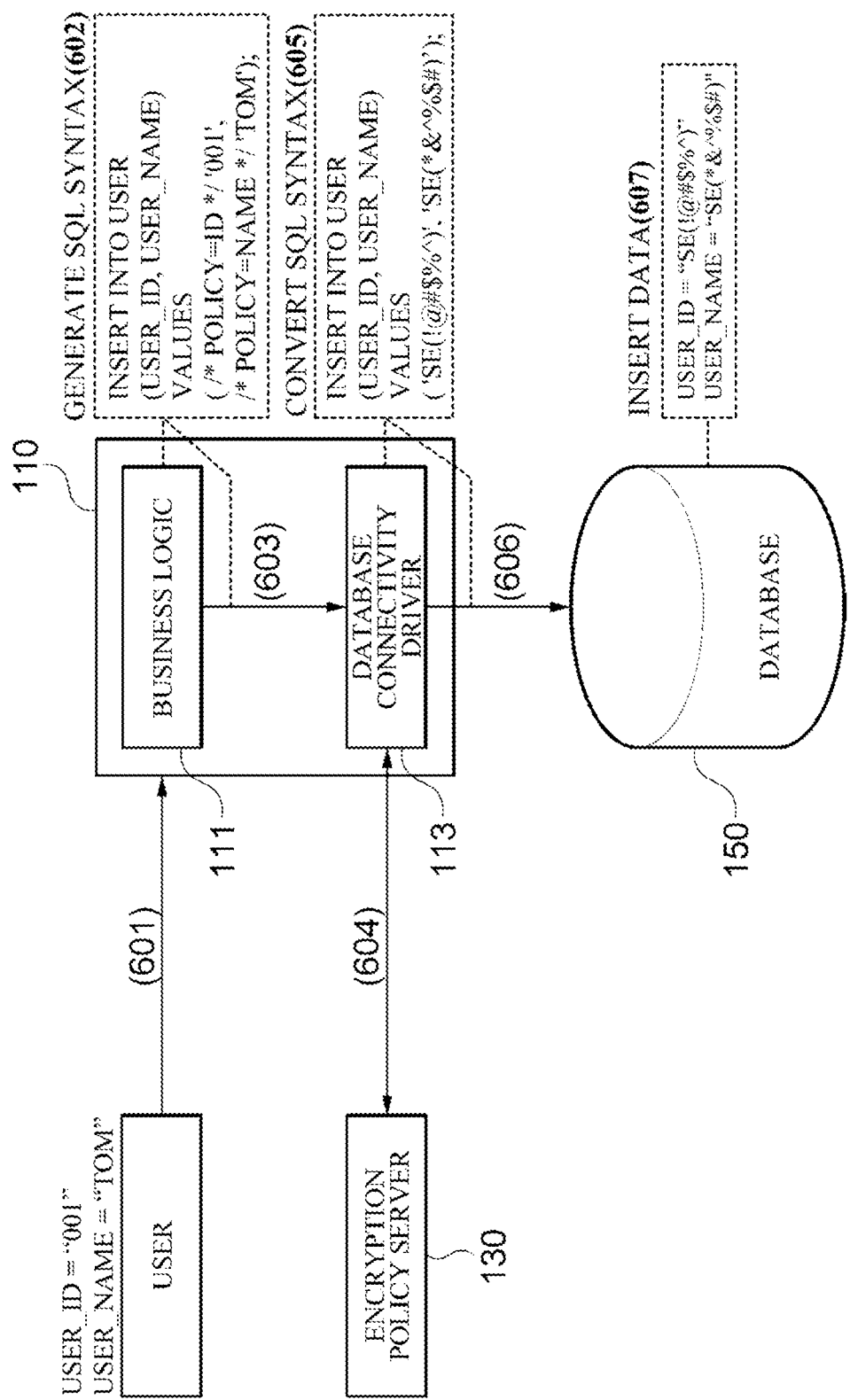
FIG. 6 is a diagram for describing an example of encrypting manipulation target data in the process of data insertion according to one embodiment.

FIG. 6 is a diagram for describing an example of encrypting manipulation target data in the process of data insertion according to one embodiment.

Referring to FIG. 6, a user may request the database 150 to insert data regarding ID and name of the user through the client device 110 (601).

Then, the client device 110 may identify "001," which is an ID of the user, and "TOM," which is name of the user, as manipulation target data through the business logic 111.

Also, the client device 110 may generate a SQL syntax for the data insertion request through the business logic 111 (602) and transmit the generated SQL syntax to a database connectivity driver 113 (603).

In this case, the SQL syntax for the data insertion request may include a DML syntax related to data insertion, manipulation target data, and encryption policy identification information in the form of an annotation. As shown in FIG. 6, an example of the SQL syntax may be "INSERT INTO USER (USER_ID, USER_NAME) VALUES (/* POLICY=ID */'001', /* POLICY=NAME */'TOM');".

Specifically, a portion of "INSERT INTO USER (USER_ID, USER_NAME) VALUES" in the SQL syntax may be a DML syntax related to data insertion. Also, a portion of "001" in the SQL syntax is the ID of the user, which is the manipulation target data, and a portion of "TOM" is the name of the user, which is the manipulation target data. In addition, "/* POLICY=ID */" in the SQL syntax may be encryption policy identification information in the form of an annotation regarding the user's ID, and "/* POLICY=NAME */" may be encryption policy identification information in the form of an annotation regarding the user's name.

Then, the client device 110 may request an encryption policy server 130 for encryption policy information through the database connectivity driver 113 on the basis of the encryption policy identification information in the form of an annotation and receive the encryption policy information that corresponds to the encryption policy identification information in the form of an annotation from the encryption policy server 130 (604). In this case, in one embodiment, encryption policy information for "ID" class and encryption policy information for "name" class may differ from each other.

Then, the client device 110 may convert the manipulation target data in the SQL syntax into cipher text on the basis of the encryption policy information through the database connectivity driver 113 (605).

Specifically, the client device 110 may convert "001," which is the user's ID in the SQL syntax, into cipher text of "!@#$%" using the encryption policy information for the "ID" class and convert "TOM," which is the user's name in the SQL syntax, into cipher text of "*&^%$#" using the encryption policy information for the "name" class. In addition, the client device 110 may include "SE( )," which is encryption application identification information, along with the cipher text included in the SQL syntax.

In this case, in one embodiment, the client device 110 may include decryption policy identification information in the converted SQL syntax or store the decryption policy identification information in the database connectivity server 113.

Then, the client device 110 may transmit the SQL syntax that includes the cipher text for the manipulation target data and the encryption application identification information to the database 150 through the database connectivity driver 113 (606).

Accordingly, the database 150 may store the cipher text for the user's ID and the cipher text for the user's name therein on the basis of the SQL syntax that corresponds to the data insertion request of the user (607). Also, in one embodiment, in the case where the decryption policy identification information is included in the SQL syntax, cipher text for the manipulation target data may be associated with the decryption policy identification information and stored in the database 150.

Figure 7:
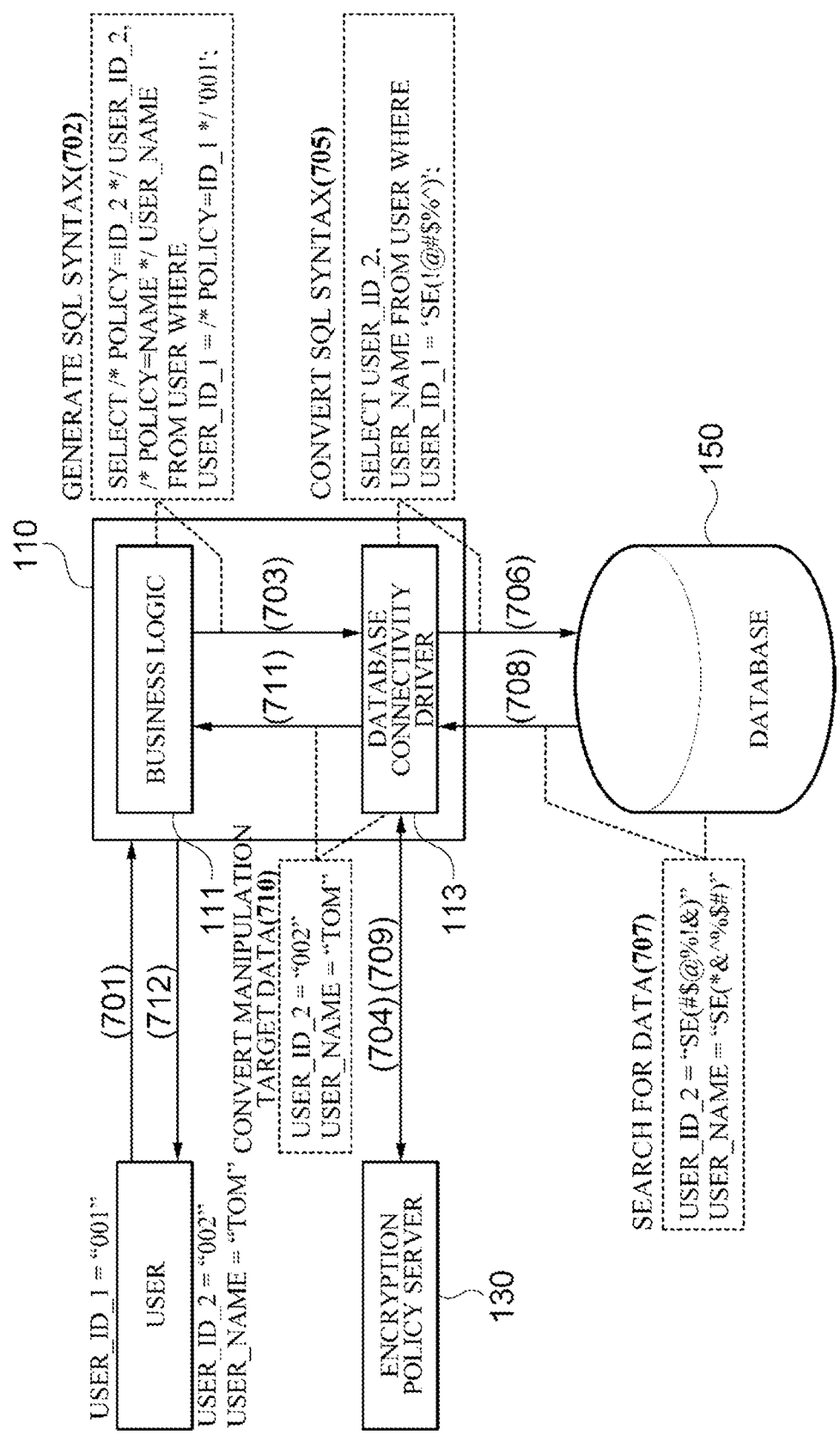
FIG. 7 is a diagram for describing an example of decrypting manipulation target data in the process of data retrieval according to one embodiment.

FIG. 7 is a diagram for describing an example of decrypting manipulation target data in the process of data retrieval according to one embodiment. Here, it is assumed that encrypted ID_2 of a user, encrypted name of the user, and encryption identification information are stored in the database 150.

Referring to FIG. 7, the user may request the database 150 to retrieve data regarding ID_2 and name of the user through the client device 110 (701). In this case, the user may input "001," which is ID_1 of the user, for data retrieval.

Then, the client device 110 may identify "001," which is ID_1 of the user, "002," which is ID_2 of the user, and "TOM," which is the user's name, as manipulation target data through the business logic 111.

Also, the client device 110 may generate a SQL syntax for the data retrieval request through the business logic 111 (702) and transmit the generated SQL syntax to the database connectivity driver 113 (703).

In this case, the SQL syntax for the data retrieval request may include a DML syntax related to data retrieval, the manipulation target data, and encryption policy identification information in the form of an annotation. For example, as shown in FIG. 7, an example of the SQL syntax for the data retrieval request may be "SELECT /* POLICY=ID_2 */ USER_ID_2, /* POLICY=NAME */ USER_NAME FROM USER WHERE USER_ID_1=/* POLICY=ID_1 */'001';".

Specifically, a portion of "SELECT USER_ID_2, USER_NAME FROM USER WHERE USER_ID_1" in the SQL syntax may be a DML syntax related to data retrieval. Also, a portion of "001" in the SQL syntax may be ID_1 of the user, which is the manipulation target data. In addition, "/* POLICY=ID_1 */" in the SQL syntax may be encryption policy identification information in the form of an annotation regarding ID_1 of the user, "/* POLICY=ID_2 */" may be decryption policy identification information in the form of an annotation regarding ID_2 of the user, and "/* POLICY=NAME */" may be decryption policy identification information in the form of an annotation regarding the name of the user.

Then, the client device 110 may request the encryption policy server 130 for encryption policy information for ID_1 of the user on the basis of the encryption policy identification information in the form of an annotation regarding ID_1 of the user through the database connectivity driver 113 and receive the encryption policy information for ID_1 of the user from the encryption policy server 130 (704). In this case, in one embodiment, the encryption policy information for "ID_1" class, the decryption policy information for "ID_2" class, and the decryption policy information for "name" class may differ from one another.

Then, the client device 110 may convert the manipulation target data in the SQL syntax into cipher text on the basis of the encryption policy information through the database connectivity driver 113 (705).

Specifically, the client device 110 may convert "001," which is ID_1 of the user in the SQL syntax, into "!@#$%^"' using the encryption policy information for the "ID_1" class.

In addition, the client device 110 may include "SE( )," which is encryption application identification information, together with the cipher text, in the converted SQL syntax.

Moreover, in one embodiment, the client device 110 may store the decryption policy identification information for ID_2 of the user and the decryption policy identification information for the name of the user in the database connectivity driver 113.

Then, the client device 110 may transmit the SQL syntax that includes the cipher text and the encryption application identification information to the database 150 through the database connectivity driver 113 (706).

Accordingly, the database 150 may search for ID_2 of the user and the name of the user on the basis of the SQL syntax that corresponds to the data retrieval request of the user (707).

Then, the database 150 may transmit encrypted ID_2 of the user and encrypted name of the user to the database connectivity driver 113 of the client device 110 (708).

Thereafter, the client device 110 may identify the encrypted ID_2 of the user and the encrypted name of the user on the basis of the encryption application identification information through the database connectivity driver 113.

Also, the client device 110 may request the encryption policy server 130 for decryption policy information for the encrypted ID_2 of the user and decryption policy information for the encrypted name of the user on the basis of the decryption policy identification information for the ID_2 of the user and the decryption policy identification information for the name of the user, which are stored in the database connectivity driver 113, and the encryption policy server 130 may transmit the decryption policy information for the encrypted ID_2 of the user and the decryption policy information for the encrypted name of the user to the client device 110 (709).

Then, the client device 110 may acquire "002," which is ID_2 of the user, by decrypting an encrypted ID of the user using the decryption policy information for the encrypted ID_2 of the user through the database connectivity driver 113 and may acquire "TOM," which is the user's name, by decrypting the encrypted name of the user using the decryption policy information for the encrypted name of the user (710).

Then, the client device 110 may transmit the acquired ID_2 and name of the user to the business logic 111 (711).

Then, the client device 110 may provide ID_2 of the user and the name of the user to the user via the business logic 111 (712).

Figure 8:
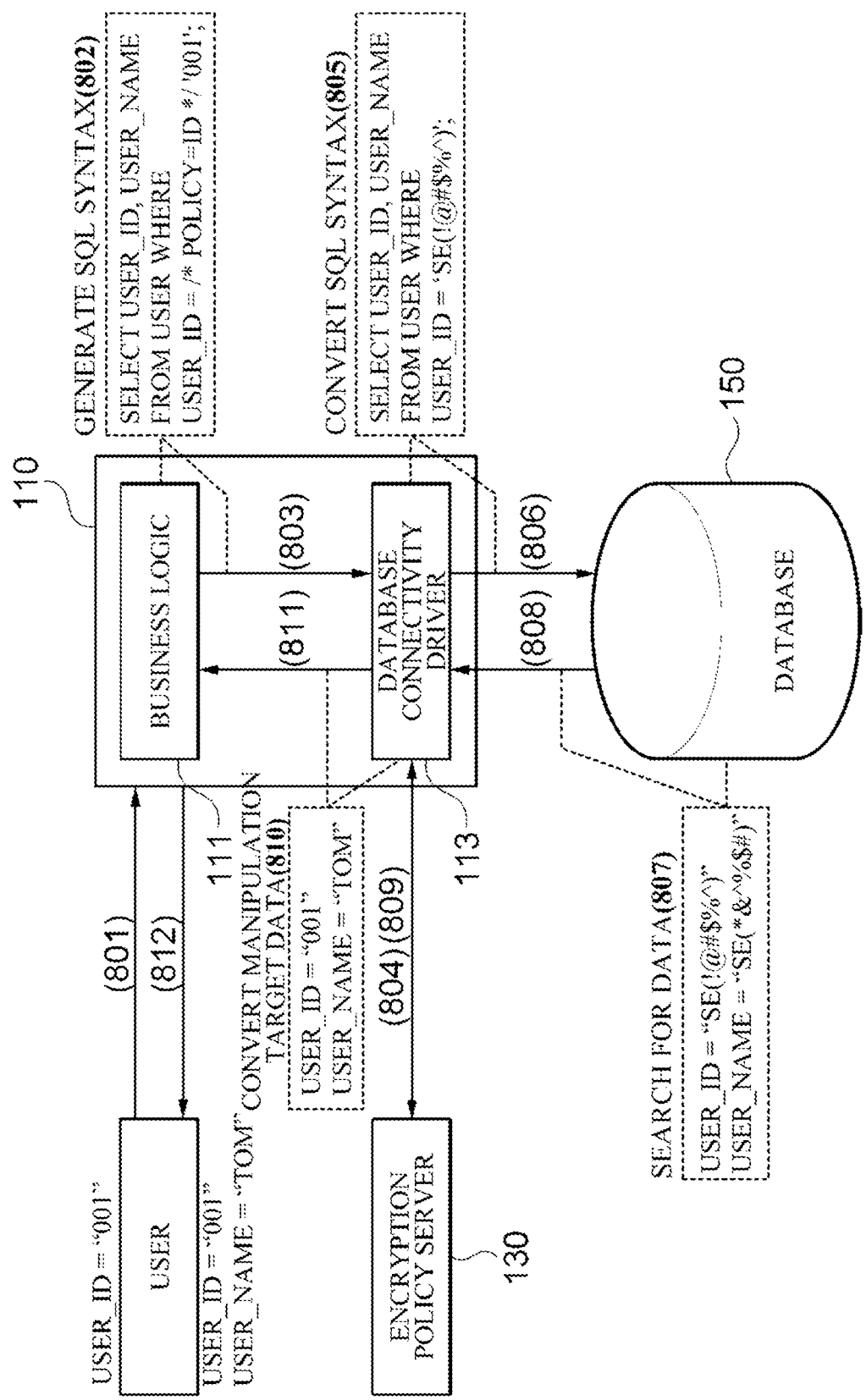
FIG. 8 is a diagram for describing another example of decrypting manipulation target data in the process of data retrieval according to one embodiment.

FIG. 8 is a diagram for describing another example of decrypting manipulation target data in the process of data retrieval according to one embodiment. Here, it is assumed that the database 150 stores an encrypted ID of the user, an encrypted name of the user, encryption identification information, and decryption policy identification information therein.

Referring to FIG. 8, the user may request the database 150 to retrieve data for the ID and name of the user through the client device 110 (801). In this case, the user may input "001," which is the ID of the user, for data retrieval.

Then, the client device 110 may identify "001," which is the ID of the user, as manipulation target data through the business logic 111.

In addition, the client device 110 may generate a SQL syntax for the data retrieval request through the business logic 111 (802) and transmit the generated SQL syntax to the database connectivity driver 113 (803).

In this case, the SQL syntax may include a DML syntax related to data retrieval, the manipulation target data, and encryption policy identification information in the form of an annotation. For example, as shown in FIG. 8, the SQL syntax may be "SELECT USER_ID, USER_NAME FROM USER WHERE USER_ID=/* POLICY=ID */'001';".

Specifically, a portion of "SELECT USER_ID, USER_NAME FROM USER WHERE USER_ID" in the SQL syntax may be a DML syntax related to data retrieval. In addition, a portion of "001" in the SQL syntax may be the ID of the user, which is the manipulation target data. Also, a portion of "/* POLICY=ID */" in the SQL syntax may be encryption policy identification information in the form of an annotation regarding the ID of the user.

Then, the client device 110 may request the encryption policy server 130 for encryption policy information on the basis of the encryption policy identification information in the form of an annotation through the database connectivity driver 113 and may receive the encryption policy information that corresponds to the encryption policy identification information in the form of an annotation from the encryption policy server 130 (804).

Then, the client device 110 may convert the manipulation target data in the SQL syntax into cipher text on the basis of the encryption policy information through the database connectivity driver 113 (805).

Specifically, the client device 110 may convert "001," which is the user's ID in the SQL syntax, into cipher text of "!@#$%^"' using the encryption policy information for the "ID" class.

In addition, the client device 110 may include "SE( )," which is encryption application identification information, together with the cipher text, in the converted SQL syntax.

Then, the client device 110 may transmit the SQL syntax that includes the cipher text and the encryption application identification information to the database 150 via the database connectivity driver 113.

As a result, the database 150 may search for an encrypted ID of the user and an encrypted name of the user on the basis of the SQL syntax that corresponds to the data retrieval request of the user (807).

Then, the database 150 may transmit the encrypted ID of the user and the encrypted name of the user to the client device 110 (808). In addition, the database 150 may also transmit the encryption application identification information and the decryption policy identification information, which are stored together with the encrypted ID of the user and the encrypted name of the user, to the client device 110. In this case, decryption policy identification information for "ID" class and decryption policy identification information for "name" class may differ from each other.

Then, the client device 110 may identify the encrypted ID of the user and the encrypted name of the user on the basis of the encryption application identification information through the database connectivity driver 113.

In addition, the client device 110 may request the encryption policy server 130 for decryption policy information for the encrypted ID of the user and decryption policy information for the encrypted name of the user on the basis of the decryption policy identification information for the encrypted ID of the user and the decryption policy identification information for the encrypted name of the user through the database connectivity driver 113, and the encryption policy server 130 may transmit the decryption policy information for the encrypted ID of the user and the decryption policy information for the encrypted name of the user to the client device 110 (809).

Then, the client device 110 may acquire "001," which is the ID of the user, by decrypting the encrypted ID of the user using the decryption policy information for the encrypted ID of the user through the database connectivity driver 113 and may acquire "TOM," which is the user's name, by decrypting the encrypted name of the user using the decryption policy information for the encrypted name of the user (810).

Then, the client device 110 may transmit the acquired ID and name of the user to the business logic 111 (811).

Then, the client 110 may provide the ID and name of the user to the user via the business logic 111 (812).

Meanwhile, although FIGS. 6 to 8 illustrate encryption or decryption in the SQL syntax for data insertion and data retrieval, encryption or decryption in the SQL syntax for data modification and data deletion may be equally applied.

Figure 9:
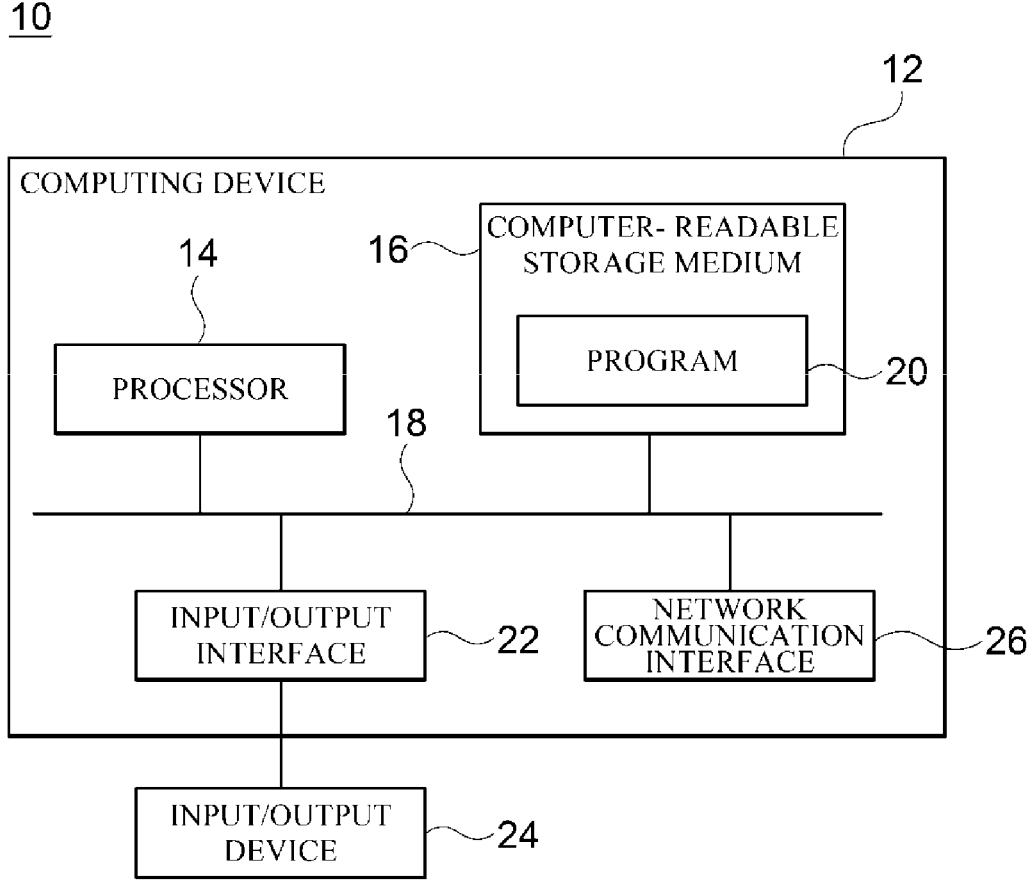
FIG. 9 is a block diagram for describing a computing environment including a computing device suitable to be used in exemplary embodiments.

FIG. 9 is a block diagram for describing a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be, for example, one or more components included in the client device 110 shown in FIG. 1. Also, in one embodiment, the computing device 12 may be, for example, one or more components included in the encryption policy server 130 shown in FIG. 1. In addition, the computing device 12 may be, for example, one or more components included in the database 150 shown in FIG. 1.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The program 20 stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

In one embodiment, the program 20 may include, for example, the client device 110 shown in FIG. 1.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of data encryption, comprising:
generating a structured query language (SQL) syntax that includes manipulation target data and encryption policy identification information in the form of an annotation regarding the manipulation target data;
receiving encryption policy information that corresponds to the encryption policy identification information in the form of an annotation from an encryption policy server; and
converting the manipulation target data in the SQL syntax into cipher text on the basis of the encryption policy information,
wherein the encryption policy identification information is metadata for requesting the encryption policy server for encryption policy information used for encrypting the manipulation target data;
the converting of the manipulation target data comprises converting the SQL syntax to include the cipher text and encryption application identification information on the basis of the encryption policy information, wherein the encryption application identification information indicates that the manipulation target data is encrypted based on the encryption policy information.

2. The method of claim 1, wherein the encryption policy information comprises at least one of a cipher key and a cipher algorithm for the encryption.

3. The method of claim 1, wherein the receiving and converting are performed at a database connectivity driver.

4. The method of claim 3, wherein the receiving of the encryption policy information comprises requesting, at the database connectivity driver, the encryption policy server for the encryption policy information on the basis of the encryption policy identification information and receiving the encryption policy information from the encryption policy server.

5. The method of claim 3, further comprising, after converting the manipulation target data, transmitting a SQL syntax that includes the cipher text, the encryption application identification information, and decryption policy identification information to a database through the database connectivity driver.

6. An apparatus for data encryption, comprising:
one or more processors;
a memory; and
one or more programs stored in the memory and configured to be executed by the one or more processors, the one or more programs comprising:
  a command for generating a structured query language (SQL) syntax that includes manipulation target data and encryption policy identification information in the form of an annotation regarding the manipulation target data;
  a command for receiving encryption policy information that corresponds to the encryption policy identification information in the form of an annotation from an encryption policy server; and
  a command for converting the manipulation target data in the SQL syntax into cipher text on the basis of the encryption policy information,
wherein the encryption policy identification information is metadata for requesting the encryption policy server for encryption policy information used for encrypting the manipulation target data,
wherein the command for converting the manipulation target data comprises a command for converting the SQL syntax to include the cipher text and encryption application identification information on the basis of the encryption policy information, wherein the encryption application identification information indicates that the manipulation target data is encrypted based on the encryption policy information.

7. The apparatus of claim 6, wherein the encryption policy information comprises at least one of a cipher key and a cipher algorithm for the encryption.

8. The apparatus of claim 6, wherein the command for receiving the encryption policy information and the command for converting the manipulation target data are performed by a database connectivity driver included in the one or more programs.

9. The apparatus of claim 8, wherein the command for receiving the encryption policy information comprises a command for requesting the encryption policy server for the encryption policy information on the basis of the encryption policy identification information and a command for receiving the encryption policy information from the encryption policy server.

10. The apparatus of claim 9, wherein the one or more programs further comprise a command for transmitting a SQL syntax that includes the cipher text and decryption policy identification information to a database through the database connectivity driver.

11. A method of data decryption, comprising:
receiving encrypted manipulation target data and encryption application identification information from a database, wherein the encryption application identification information indicates that manipulation target data is encrypted based on encryption policy information;
identifying the encrypted manipulation target data based on the encryption application identification information;
receiving decryption policy information that corresponds to decryption policy identification information for the encrypted manipulation target data from an encryption policy server on the basis of the decryption policy identification information; and
decrypting the encrypted manipulation target data on the basis of the decryption policy information,
wherein the decryption policy identification information is metadata for requesting the encryption policy server for decryption policy information used for decrypting the encrypted manipulation target data.

12. The method of claim 11, wherein the decryption policy information comprises at least one of a cipher key and a cipher algorithm for the decryption.

13. The method of claim 11, wherein the receiving of the encrypted manipulation target data, the receiving of the decryption policy information, and the decrypting the encrypted manipulation target data are performed by a database connectivity driver.

14. The method of claim 13, wherein the receiving of the decryption policy information comprises requesting, at the database connectivity driver, the encryption policy server for the decryption policy information on the basis of the decryption policy identification information and receiving the decryption policy information from the encryption policy server.

15. The method of claim 11, further comprising providing the acquired manipulation target data to a user.

16. An apparatus for data decryption, comprising:
one or more processors;
a memory; and
one or more programs stored in the memory and configured to be executed by the one or more processors, the one or more programs comprising:
  a command for receiving encrypted manipulation target data and encryption application identification information from a database, wherein the encryption application identification information indicates that manipulation target data is encrypted based on encryption policy information;
  a command for identifying the encrypted manipulation target data based on the encryption application identification information;
  a command for receiving decryption policy information that corresponds to decryption policy identification information for the encrypted manipulation target data from an encryption policy server on the basis of the decryption policy identification information; and
  a command for decrypting the encrypted manipulation target data on the basis of the decryption policy information,
wherein the decryption policy identification information is metadata for requesting the encryption policy server for decryption policy information used for decrypting the encrypted manipulation target data.

17. The apparatus of claim 16, wherein the decryption policy information comprises at least one of a cipher key and a cipher algorithm for the decryption.

18. The apparatus of claim 16, wherein the command for receiving the encrypted manipulation target data, the command for receiving the decryption policy information, and the command for decrypting the encrypted manipulation target data are performed by a database connectivity driver included in the one or more programs.

19. The apparatus of claim 18, wherein the command for receiving the decryption policy information comprises a command for requesting the encryption policy server for the decryption policy information on the basis of the decryption policy identification information and a command for receiving the decryption policy information from the encryption policy server.

20. The apparatus of claim 16, wherein the one or more programs further comprise a command for providing the acquired manipulation target data to a user.

\* \* \* \* \*